UNITED STATES PATENT OFFICE 1,938,175

MANUFACTURE OF ALKYL HYPOHALITES

Richard M. Deanesly, Berkeley, Calif., assignor to Shell Development Company, San Francisco, Calif., a corporation of Delaware No Drawing. Application September 26, 1932
Serial No. 634,927

15 Claims. (Cl. 260—98)

The invention relates to the production of alkyl hypohalites, such as the hypochlorites and hypobromites, and more particularly is concerned with a method for their production whereby valuable economies are effected through the conservation of the alkaline agent and halogen and wherein higher yields of end-product are realized per unit of alkaline agent employed.

It appears to be generally believed that, in order to prepare an alkyl hypohalite, elementary halogen must be added to a mixture, preferably aqueous, of caustic soda, caustic potash or the like in the ratio of 2:1 (i. e., 2 mols M—OH to 1 mol of alcohol wherein M represents an alkali-metal).

It appears to be further believed that when a divalent alkaline agent is employed, such as the alkaline earth-metal oxides, hydroxides and the like, it is necessary to use a ratio of 1:1 due to the fact that a divalent alkaline agent has twice the number of available basic groups per metallic atom as the corresponding monovalent or alkali-metal alkaline agent.

These beliefs probably arose from the fact that the formation of sodium hypochlorite from chlorine and sodium hydroxide is always accompanied by the formation of an equivalent of sodium chloride according to the reaction:

$$2NaOH+Cl_2 \rightarrow NaCl+NaOCl+H_2O$$

It seems to have been assumed that this same ratio of alkaline agent must be used when alcohol is also present for the purpose of making the corresponding alkyl hypohalite.

I have discovered that substantially quantitative yields (on the basis of each and all reactants) of alkyl hypohalites can be obtained by executing the reaction with substantially equimolal parts of alcohol and alkaline agent when the latter is monovalent and with one mol of alcohol per 0.5 mol of divalent alkaline agent.

The reaction proceeds smoothly according to the following:

$$NaOH+C_4H_9OH+Cl_2 \rightarrow C_4H_9OCl+NaCl+H_2O$$

Not only does my process avoid the employment of substantial excess of alkaline agent, but also employment of a like excess of halogen: for as the alkyl hypohalite is rapidly hydrolyzed in the presence of free alkali, it does not form quantitatively when halogen is introduced into an aqueous mixture of alcohol and alkali until the solution has become approximately neutral through saturation with halogen. Accordingly, prior investigators have wasted large amounts of halogen in neutralizing the excess alkaline agent employed, and have not attained, so far as I am aware, quantitative yields based on the use of equivalent quantities of the three reagents on the basis of the following typical reactions:

$$KOH+ROH+Cl_2 \rightarrow ROCl+KCl+H_2O$$
$$Ca(OH)_2+2ROH+2Cl_2 \rightarrow 2ROCl+CaCl_2+2H_2O$$

The process can be carried out as a continuous, intermittent or a batch operation.

Any aliphatic alcohol of primary, secondary, or tertiary character can be employed. Methyl-, ethyl-, propyl-, butyl-, and amyl alcohols, isopropyl-, secondary butyl-, secondary amyl- and secondary hexyl alcohols, tertiary butyl-, tertiary amyl-, tertiary hexyl alcohols and the like are species illustrating the applicability of my process to the generic class.

The process can be conducted using a homogeneous (one phase) solution of alcohol and alkaline agent. Equally good yields are obtained using a lesser quantity of water and agitating the two phase mixture of alcohol, alkaline agent and water while passing in elementary halogen which may be either in the gaseous or liquid state although previous workers have thought it necessary to employ homogeneous solutions. By operating with a two phase system, I avoid the use of an unnecessarily large bulk of water.

For purposes of illustration only, reference will be had to a continuous process wherein the reaction is carried out with tertiary butyl alcohol which is exemplary of aliphatic alcohols, regardless whether they are primary, secondary, or tertiary.

Chlorine is passed upwards through a packed scrubbing column down which a mixture of aqueous sodium hydroxide and alcohol is allowed to flow. By adjustment of the rates of flow and/or recycling of a portion of the lower layer from the bottom of the column, substantially quantitative yields of tertiary butyl hypochlorite may be withdrawn continuously.

The crude tertiary butyl hypochlorite formed contains small quantities of dissolved chlorine. This is a harmful impurity when using the hypochlorite for the purpose of reaction with an olefine and water to form the chlorhydrin of the olefine. It can be removed only partially by extraction with water. The chlorine may, however, be adequately removed by boiling the hypochlorite under reflux in darkness or by any other physical degassing process.

Instead of chlorine, one may successfully employ bromine either in the gaseous or liquid state.

The alkaline agent may first react with the free halogen to form a corresponding salt of the hypohalogenous acid and the monohydric aliphatic alcohol subsequently reacted therewith.

Since it is well-known that primary and secondary alkyl hypohalites are less stable than the tertiary alkyl hypohalites, it may be convenient in preparing the first two types to incorporate in the reaction mixture suitable stabilizing agents which are known to the art.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process for preparing alkyl hypohalites, comprising: reacting a monohydric aliphatic alcohol with water and halogen in the presence of an alkaline agent, the alcohol and alkaline agent being present in substantially equivalent parts, the operation being conducted with so little water that the reaction is carried out in a two phase mixture which is maintained under agitation.

2. A process for preparing alkyl hypohalites, comprising: reacting a monohydric aliphatic alcohol with a salt of a hypohalogenous acid, the alcohol and the basic constituent of the salt being present in substantially equivalent parts, the operation being conducted with so little water that the reaction is carried out in a two phase mixture which is maintained under agitation.

3. A process for preparing alkyl hypohalites, comprising: reacting a monohydric aliphatic alcohol with water and halogen in the presence of a monovalent alkaline agent, the alcohol and alkaline agent being present in substantially equimolal parts, the operation being conducted with so little water that the reaction is carried out in a two phase mixture which is maintained under agitation.

4. A process for preparing alkyl hypohalites, comprising: reacting a monohydric aliphatic alcohol with water and halogen in the presence of a divalent alkaline agent, 0.5 mol of divalent alkaline agent being present per substantially 1.0 mol of alcohol, the operation being conducted with so little water that the reaction is carried out in a two phase mixture which is maintained under agitation.

5. A process for preparing alkyl hypohalites, comprising: reacting a monohydric aliphatic alcohol with water and halogen in the presence of an alkaline agent of the group consisting of alkali-metal- and alkaline earth metal hydroxides, the alcohol and alkaline agent being present in substantially equivalent parts, the operation being conducted with so little water that the reaction is carried out in a two phase mixture which is mainained under agitation.

6. A process for preparing alkyl hypochlorites, comprising: reacting a monohydric aliphatic alcohol with water and chlorine in the presence of an alkali-metal hydroxide, the alcohol and alkali-metal hydroxide being present in substantially equimolal parts, the operation being conducted with so little water that the reaction is carried out in a two phase mixture which is maintained under agitation.

7. A process for preparing alkyl hypochlorites, comprising: reacting a monohydric aliphatic alcohol with an alkali-metal salt of hypochlorous acid, the alcohol and alkali-metal being present in substantially equimolal parts, the operation being conducted with so little water that the reaction is carried out in a two phase mixture which is maintained under agitation.

8. A process for preparing alkyl hypohalites, comprising: reacting a monohydric aliphatic tertiary alcohol with water and halogen in the presence of an alkaline agent, the alcohol and alkaline agent being present in substantially equivalent parts, the operation being conducted with so little water that the reaction is carried out in a two phase mixture which is maintained under agitation.

9. A process for preparing alkyl hypohalites, comprising: reacting a monohydric aliphatic tertiary alcohol with an alkali-metal salt of a hypohalogenous acid, the alcohol and alkali-metal being present in substantially equimolal parts, the operation being conducted with so little water that the reaction is carried out in a two phase mixture which is maintained under agitation.

10. A process for preparing alkyl hypochlorites, comprising: reacting a monohydric aliphatic alcohol containing at least three carbon atoms to the molecule with water and chlorine in the presence of an alkali-metal hydroxide, the alcohol and alkali-metal hydroxide being present in substantially equimolal parts, the operation being conducted with so little water that the reaction is carried out in a two phase mixture which is maintained under agitation.

11. A process for preparing alkyl hypochlorites, comprising: reacting a monohydric aliphatic alcohol containing at least three carbon atoms to the molecule with a salt of hypochlorous acid, the alcohol and the basic constituent of the salt being present in substantially equivalent parts, the operation being conducted with so little water that the reaction is carried out in a two phase mixture which is maintained under agitation.

12. A process for preparing alkyl hypochlorites, comprising: reacting a monohydric aliphatic alcohol with the reaction product of sodium hydroxide, chlorine and water, the alcohol and sodium hydroxide being present in substantially equimolal parts, withdrawing the hypochlorite from the reaction mixture and refining the former of its contained uncombined chlorine.

13. A process for preparing alkyl hypochlorites, comprising: reacting a monohydric aliphatic alcohol with water, chlorine and sodium hydroxide, the alcohol and sodium hydroxide being present in substantially equimolal parts, withdrawing the hypochlorite from the reaction mixture and degrassing the former to remove uncombined chlorine.

14. A process for preparing alkyl hypohalites, comprising: reacting a monohydric aliphatic alcohol with water, halogen and an alkaline agent, the alcohol and alkaline agent being present in substantially equivalent parts, the operation being conducted with so little water that the reaction is carried out in a two phase mixture which is maintained under agitation.

15. A process for preparing alkyl hypohalites, comprising reacting a monohydric aliphatic alcohol with water and halogen in the presence of an alkaline agent, the alcohol and alkaline agent being present in substantially equivalent parts, withdrawing the hypohalite from the reaction mixture and refining the former of its contained uncombined chlorine.

RICHARD M. DEANESLY.